(12) United States Patent
Lube et al.

(10) Patent No.: US 7,748,301 B2
(45) Date of Patent: Jul. 6, 2010

(54) MACHINE-TOOL REVOLVER UNIT

(75) Inventors: Siegfried Lube, Weilheim/Teck (DE); Stefan Schön, Bielefeld (DE); Jürgen Walz, Frickenhausen (DE)

(73) Assignee: Gildemeister Drehmaschinen GmbH (DE)

( * ) Notice: Subject to any disclaimer, the term of this patent is extended or adjusted under 35 U.S.C. 154(b) by 0 days.

(21) Appl. No.: 12/370,042

(22) Filed: Feb. 12, 2009

(65) Prior Publication Data

US 2009/0209399 A1    Aug. 20, 2009

(30) Foreign Application Priority Data

Feb. 16, 2008   (DE) .................... 10 2008 009 559

(51) Int. Cl.
*B23B 29/32*   (2006.01)
*B23Q 3/155*   (2006.01)

(52) U.S. Cl. .......................... 82/121; 29/35.5

(58) Field of Classification Search ................ 82/121, 82/120, 117, 129, 159; 29/35.5, 36, 39, 27 C
See application file for complete search history.

(56) References Cited

U.S. PATENT DOCUMENTS

| | | | | |
|---|---|---|---|---|
| 3,946,471 A | * | 3/1976 | Link | 29/44 |
| 4,180,894 A | * | 1/1980 | Link | 29/36 |
| 4,887,345 A | * | 12/1989 | Saito et al. | 483/39 |
| 5,768,757 A | * | 6/1998 | Link | 29/48.5 R |
| 7,266,871 B2 | * | 9/2007 | Takeuchi et al. | 29/27 C |
| 7,395,589 B1 | * | 7/2008 | Kuo | 29/40 |
| 7,509,719 B2 | * | 3/2009 | Neumeier | 29/40 |
| 2007/0071381 A1 | * | 3/2007 | Neumeier | 384/373 |

FOREIGN PATENT DOCUMENTS

| | | |
|---|---|---|
| DE | 121042 | 7/1976 |
| DE | 29924531 | 9/2003 |

* cited by examiner

*Primary Examiner*—Will Fridie, Jr.
(74) *Attorney, Agent, or Firm*—Bourque & Associates

(57) ABSTRACT

A machine-tool turret-type unit includes a turret disk that is free to rotate about a rotational axis, and a housing on which to mount the turret disk is provided. The housing includes at least one securing device to be secured to the securing section of the machine tool. The securing device includes at least one securing surface to rest against the securing section of the machine tool. The rotational axis lies within a first plane defined by the securing surface(s).

2 Claims, 2 Drawing Sheets

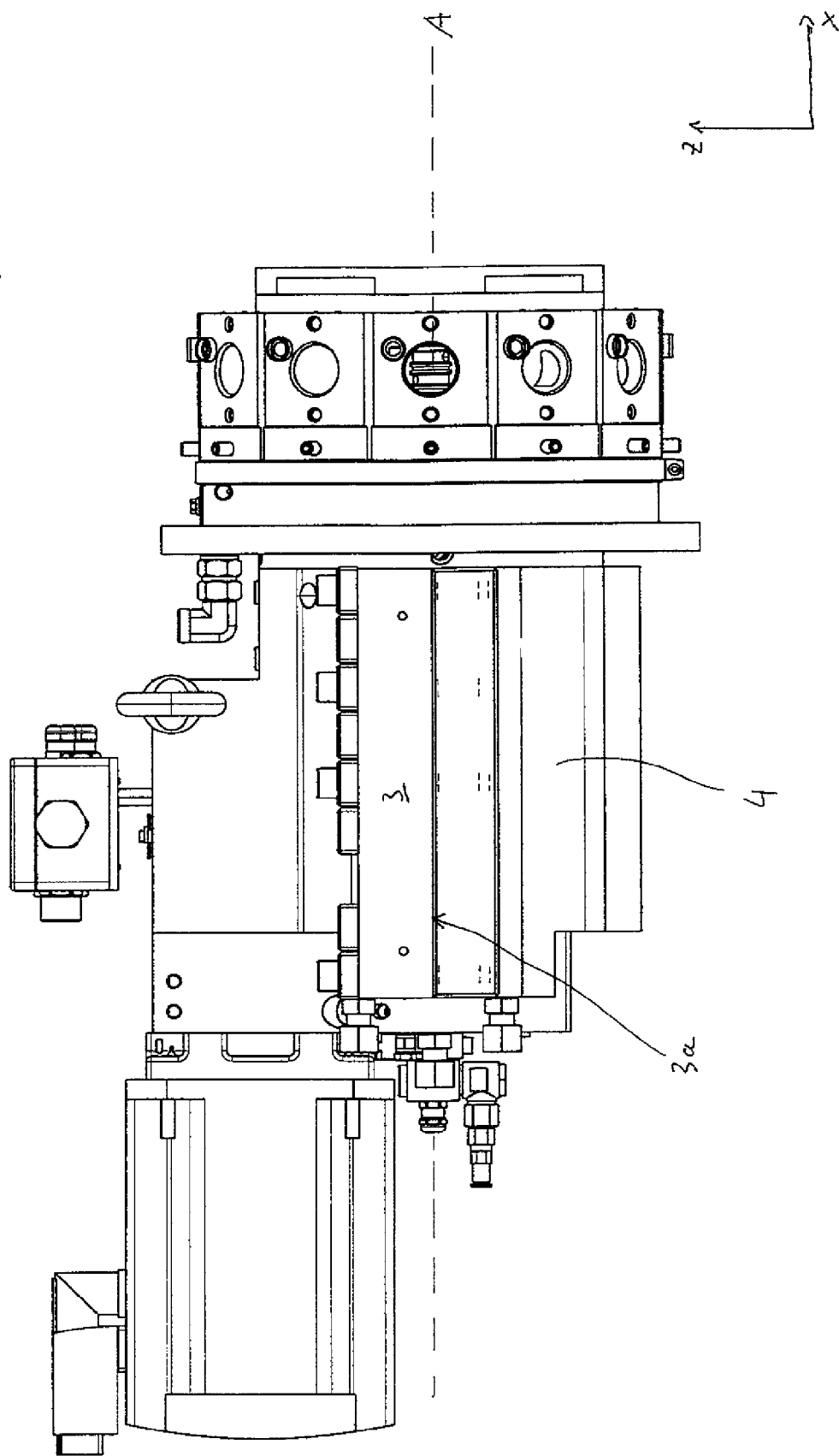

MACHINE-TOOL REVOLVER UNIT

TECHNICAL FIELD

The present invention relates to machine tools and more particularly, to a turret-type machine tool holder.

BACKGROUND INFORMATION

A prior art turret-type machine tool holder unit is known, for example, from DE 299 24 531 U1 and DD 121 042. In these prior art devices, a turret disk is attached to a shaft mount using suitable means within a housing (7a) so that it may rotate. The housing also serves to secure the turret disk tool to the lathe mount (7), and includes, for this purpose, a connector flange by means of which it is attached by threaded connectors to the corresponding securing section of the lathe.

During turret operation, the turret housing (7a) is strongly heated by the drive, the transmission, and the bearings of the lathe so that the turret expands from the securing surface (the intersection between 7a and 7) because of thermal expansion connected with rising temperatures. This in turn displaces the switching axis of the turret and/or the rotational axis about which the turret disk rotates, along with the tools mounted therein. This displacement causes dimensional deviation, and thus inaccuracy during processing of the work piece.

SUMMARY

It is the task of the invention to provide a turret-type machine unit of the type mentioned at the outset in which such deviations are prevented to the greatest extent possible.

This task is solved, based on the invention, by providing a housing shaped such that the rotational axis of the turret disk rests against the lathe within the securing plane of the housing. Upon heating, the housing expands outward with respect to the securing plane, but the rotational axis is not displaced, but rather remains within the securing plane. The housing is advantageously formed as a mirror reflection of a second plane perpendicular to the securing plane, whereby the rotational axis also lies within this plane so that it forms the intersecting line between the first securing plane and the second plane. Thus, displacement of the rotational axis occurring parallel to the securing plane is prevented because the thermal expansion of the housing occurs evenly away from the plane of symmetry because of the mirror symmetry, and thus the position of the rotational axis is not changed.

BRIEF DESCRIPTION OF THE DRAWINGS

These and other features and advantages of the present invention will be better understood by reading the following detailed description, taken together with the drawings wherein:

FIG. 2 is a lateral view of a machine-tool turret-type unit according to the present invention.

DETAILED DESCRIPTION OF THE PREFERRED EMBODIMENTS

Figure 1:
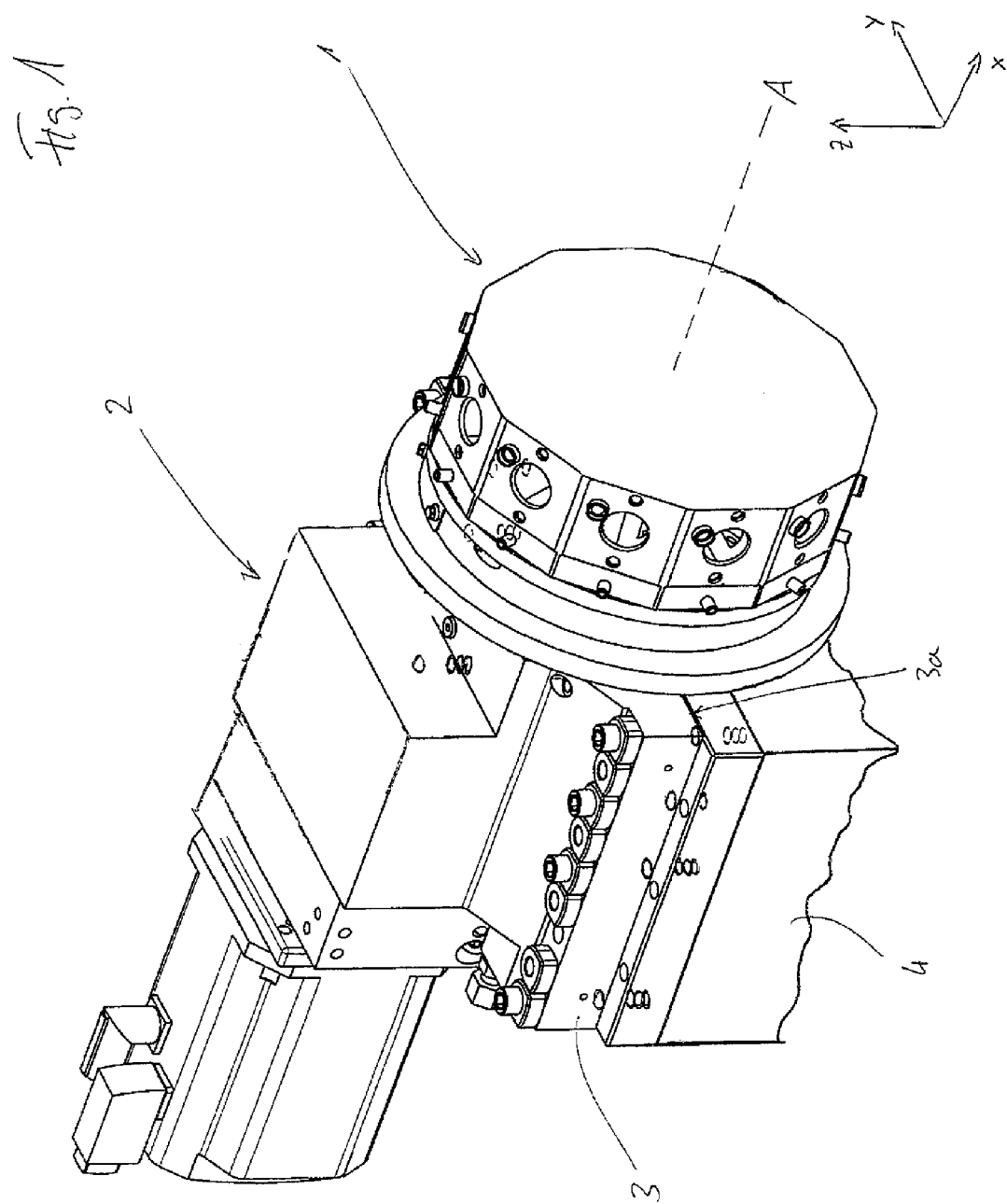
FIG. 1 is a perspective view of a machine-tool turret-type unit according to the invention.

In the following, the invention will be described in greater detail using schematic FIGS. 1 and 2 that use the same reference indices, whereby the X-direction designates the direction parallel to the rotational axis. The machine-tool turret-type unit based on the invention and shown in FIGS. 1 and 2 includes a turret disk 1 that may rotate about the rotational axis A and that is driven by means of a shaft mounted in the housing 2. The housing 2 includes at least one securing device 3 to be secured to a securing section 4 of a machine tool that is not shown for the sake of clear view. The attachment between the housing 2 and the securing section 4 occurs based on the invention within a securing plane 3a lying parallel to the X- and the Y-directions (XY plane), and within which the rotational axis A of the turret disk 1 is mounted. This achieves the fact that the rotational axis A does not expand along with the housing 2 during its thermal expansion, causing displacement of the rotational axis A, but rather that the rotational axis A (at least to a very large extent) remains within the plane defined by the securing surface(s) 3a of the securing device 3. Vertical displacement (along the Z-direction) or horizontal displacement (along the Y-direction) of the rotational axis during heating of the housing 2 is thus prevented.

The housing 2 is advantageously formed with mirror symmetry to a second plane lying perpendicular to the X- and the Y-directions (XY plane), whereby the second plane is so positioned that the rotational axis A forms the intersecting axis of the two planes.

Thus, during heating, the housing 2 also expands outward along the Y-axis from the second plane, but uniformly, so that displacement of the rotational axis [A] along the Y-axis (perpendicular to the rotational axis) does not occur.

The solution based on the invention prevents displacement of the rotational axis of the turret disk and/or switching axis of the turret-lathe turret unit caused by thermal expansion is prevented so that more precise processing of a work piece is allowed.

Modifications and substitutions by one of ordinary skill in the art are considered to be within the scope of the present invention, which is not to be limited except by the allowed claims and their legal equivalents.

The invention claimed is:

1. A machine-tool turret-type unit for machine tools with a turret disk (1) free to rotate about a rotational axis (A), and having a housing (2) within which means to mount the turret disk (1) are provided, whereby the housing (2) includes at least one securing device (3) configured to secure the turret disk (1) to the securing section (4) of a machine tool, characterized in that the securing device (3) includes at least one generally planar securing surface (3a), wherein the at least one generally planar securing surface (3a) lies within a first plane (XY) and is configured to rest against the securing section (4) of a lathe, wherein the attachment between the housing (2) and the securing section (4) occurs within the at least one generally planar securing surface (3a) lying parallel to the first plane (XY) and within which the rotational axis (A) of the turret disk (1) is mounted, whereby the rotational axis (A) of the turret disk lies within the first plane (XY) and when heated, the housing (2) expands outward with respect to the at least one generally planar securing surface (3a) and the rotational axis remains within the first plane (XY).

2. A machine-tool turret-type unit as in claim 1, characterized in that the housing (2) is formed to be mirror-symmetrical to a second plane (YZ) perpendicular to the first plane (XY), whereby the second plane is so positioned that the rotational axis A forms the intersecting axis of the first and second planes.

* * * * *